United States Patent [19]
Albert et al.

[11] Patent Number: 5,372,061
[45] Date of Patent: Dec. 13, 1994

[54] ESPRESSO/CAPPUCCINO APPARATUS AND METHOD

[75] Inventors: A. F. Albert; Robert C. Morgan, both of Seattle, Wash.

[73] Assignee: Avanti Espresso U.S.A., Inc., Seattle, Wash.

[21] Appl. No.: 46,636

[22] Filed: Apr. 14, 1993

[51] Int. Cl.⁵ .................................. A47J 31/30
[52] U.S. Cl. ........................... 99/281; 99/293
[58] Field of Search .................. 99/279, 280, 281, 282, 99/288, 293, 294, 295, 300, 301, 302 R, 299; 426/433

[56] References Cited

U.S. PATENT DOCUMENTS

| | | | |
|---|---|---|---|
| D. 281,943 | 12/1985 | Rosalgino | D7/309 |
| D. 296,972 | 8/1988 | Roccio | D7/309 |
| 4,480,173 | 10/1984 | Butterfield | 219/312 |
| 4,484,515 | 11/1984 | Illy | 99/282 |
| 4,505,191 | 3/1985 | Longo | 99/300 |
| 4,551,611 | 11/1985 | Longo | 219/308 |
| 4,632,024 | 12/1986 | Cortese | 99/300 |
| 4,634,838 | 1/1987 | Berz | 219/297 |
| 4,651,632 | 3/1987 | Motsch | 99/283 |
| 4,653,389 | 3/1987 | Hayes | 99/280 |
| 4,763,566 | 8/1988 | Paoletti | 99/302 P |
| 4,779,519 | 10/1988 | Giuliano | 99/275 |
| 4,800,805 | 1/1989 | Mahlich | 99/293 |
| 4,858,522 | 8/1989 | Castelli | 99/280 |
| 4,871,089 | 10/1989 | Rader et al. | 222/54 |
| 4,945,824 | 8/1990 | Borgmann | 99/293 |
| 4,947,738 | 8/1990 | Eugster | 99/293 |
| 4,949,627 | 8/1990 | Nordskog | 99/281 |
| 4,967,648 | 11/1990 | Helbling | 99/280 |
| 4,969,601 | 11/1990 | Wright | 239/135 |
| 4,970,948 | 11/1990 | Giannelli | 99/280 |
| 4,978,229 | 12/1990 | Hughes | 374/30 |
| 5,014,611 | 5/1991 | Illy | 99/281 |
| 5,017,759 | 5/1991 | Baldacci | 392/386 |
| 5,019,690 | 5/1991 | Knepler | 219/400 |
| 5,044,901 | 9/1991 | Fumero et al. | 417/474 |
| 5,046,409 | 9/1991 | Henn | 99/307 |
| 5,063,836 | 11/1991 | Patel | 99/281 |
| 5,127,318 | 7/1992 | Selby, III | 99/295 |
| 5,154,110 | 10/1992 | Chang | 99/281 |
| 5,154,111 | 10/1992 | Luciano | 99/289 R |

FOREIGN PATENT DOCUMENTS

| | | |
|---|---|---|
| 722382 | 11/1965 | Canada . |
| 0140841 | 5/1985 | European Pat. Off. . |
| 0328704 | 8/1989 | European Pat. Off. . |
| 8400492A | 9/1985 | Netherlands . |
| 0636254 | 6/1979 | Switzerland . |
| 2101471A | 1/1983 | United Kingdom . |

*Primary Examiner*—R. W. Jenkins
*Attorney, Agent, or Firm*—Seed and Berry

[57] ABSTRACT

Several unique features for an improved espresso/cappuccino maker are disclosed. A method and apparatus for replenishing the steam tank for a cappuccino steam dispenser in which the cold replenishing water can only be added in stepped sequences, and only after the water in the tank has reached its desired operating temperature. The dispensing unit for holding the coffee filter is maintained in a constantly heated condition by direct thermal conductivity from the metal surface of the hot water tank which is nested and in direct contact with the metal of the dispensing assembly. The temperature probe for the steam wand is housed internally of the steam wand with only a tip protruding for ease of cleaning. Also, the entire steam wand assembly and solenoid control valve are pivotally mounted as a unit to eliminate the need for internal slip joints in the steam lines. A portafilter has an integral screen for holding a single, a double, or a double-double portion of ground coffee.

6 Claims, 5 Drawing Sheets

ESPRESSO/CAPPUCCINO APPARATUS AND METHOD

TECHNICAL FIELD

This invention relates to machines and methods for making hot beverages, particularly those used for making espresso coffee and for the preparation of cappuccino of a type topped off with foam or frothed milk.

BACKGROUND OF THE INVENTION

Espresso machines for making a rich, highly concentrated coffee in a regular cup or demitasse are well known. These machines are also adapted for heating a separate cup of hot milk and foaming that milk for topping the hot coffee or espresso.

This invention relates to several improved features of such espresso and cappuccino making machines and to methods of controlling the dispensing of the steam when frothing or heating the milk.

SUMMARY OF THE INVENTION

One of the features of the machine is a steam dispensing control for a steam tank used in an espresso maker. The tank has a large reservoir of hot water maintained within a desired steam dispensing temperature range. The tank has a high water level sensor, a low water level sensor, a temperature sensor and a heating element. A controller is provided for admitting cold water to replenish the supply of water in the tank only when the temperature in the tank is above a minimum value of the desired temperature range or when the water level in the tank drops below the low water level sensor. Thereafter, the cold water is emitted in stepped sequence admitting water until the desired temperature drops below its desired range and then stops. The heating element brings the water temperature up to the desired temperature. More water is then emitted until it again brings the water temperature down below the desired temperature range. This stepped sequence is continued until the water is brought back up to the high level sensor.

This technique for stepped sequencing of replenishing of the water assures that a reserve supply of water within the design temperature range is always available for extracting steam. If the demand for steam exceeds the ability for the water to be brought up to the desired level, steam will continue to be dispensed until the water level reaches the low water level sensor, after which replenishment occurs as in a standard steam tank, that is, water is added irrespective of the temperature assuring that the water level will not fall below the low water level sensor.

Using this type of steam generating control an almost constant supply of steam is available at least to the capacity of the reservoir of water between the upper level water sensor and the lower level water sensor which, in this preferred embodiment, is about 2.8 gallons, but can vary in size.

A second feature of the invention is the use of the thermal conductivity between the hot water tank and the brewed coffee dispensing unit. The hot water tank is nested directly against the metal of the dispensing unit so that the heat of the water in the tank is transmitted by thermal conductivity through the wall of the tank into the metal dispensing unit so that the dispensing unit is always at a high temperature. This assures that the water admitted into the coffee and filter holder in the dispensing unit will not be chilled but rather will arrive at its hot temperature. The system using thermal conductivity between the water tank surface in contact with the dispensing unit is a very simple technique for assuring that the dispensing unit remains hot.

A third feature of the invention is the use of an internal temperature probe that is housed within the hollow steam wand tube. The temperature probe extends out from the bottom of the wand and is sealed in the end of the wand. In this manner, the temperature probe is always available to determine the temperature of the steamed milk and yet is very easy to clean since it needs only be wiped clear of milk residue after being used. The steam wand is provided with steam dispensing openings adjacent to the protruding tip of the temperature probe so that the area around the temperature probe within the steam wand is also easily cleaned by flushing with hot steam. These openings are set at an angle so as to direct the steam externally away from the probe tip. This allows the heated milk only to actively engage the probe, thereby giving accurate temperature readings.

A fourth feature of the invention is the provision of a swivel connection for the steam wand which enables the wand and the steam control solenoid valve all to be moved as a unit when pivoting the wand from an upper position to a lower position. In the upper position the wand is inserted into the cup or pitcher of milk and in the lower position the steam wand may be placed over the excess water drain board. Since the entire assembly of the wand and the solenoid control valve are free to pivot, there is no need for expensive and high-maintenance slip connections between the wand and stationery portions of the wand supporting mechanism.

A fifth feature of the invention is a portafilter that has an integral sieve or screen for supporting the ground coffee beans while water is admitted for brewing. In the preferred embodiment, a pressure relief mechanism is incorporated into the portafilter. This relief valve controls the pressure at which the brewing water is allowed through the beans and removes the necessity for "tamping" which is demanded by other machines. In this configuration, no basket and basket retainer clips are needed, thus making the apparatus much simplified.

DETAILED DESCRIPTION OF THE INVENTION

Figure 1:
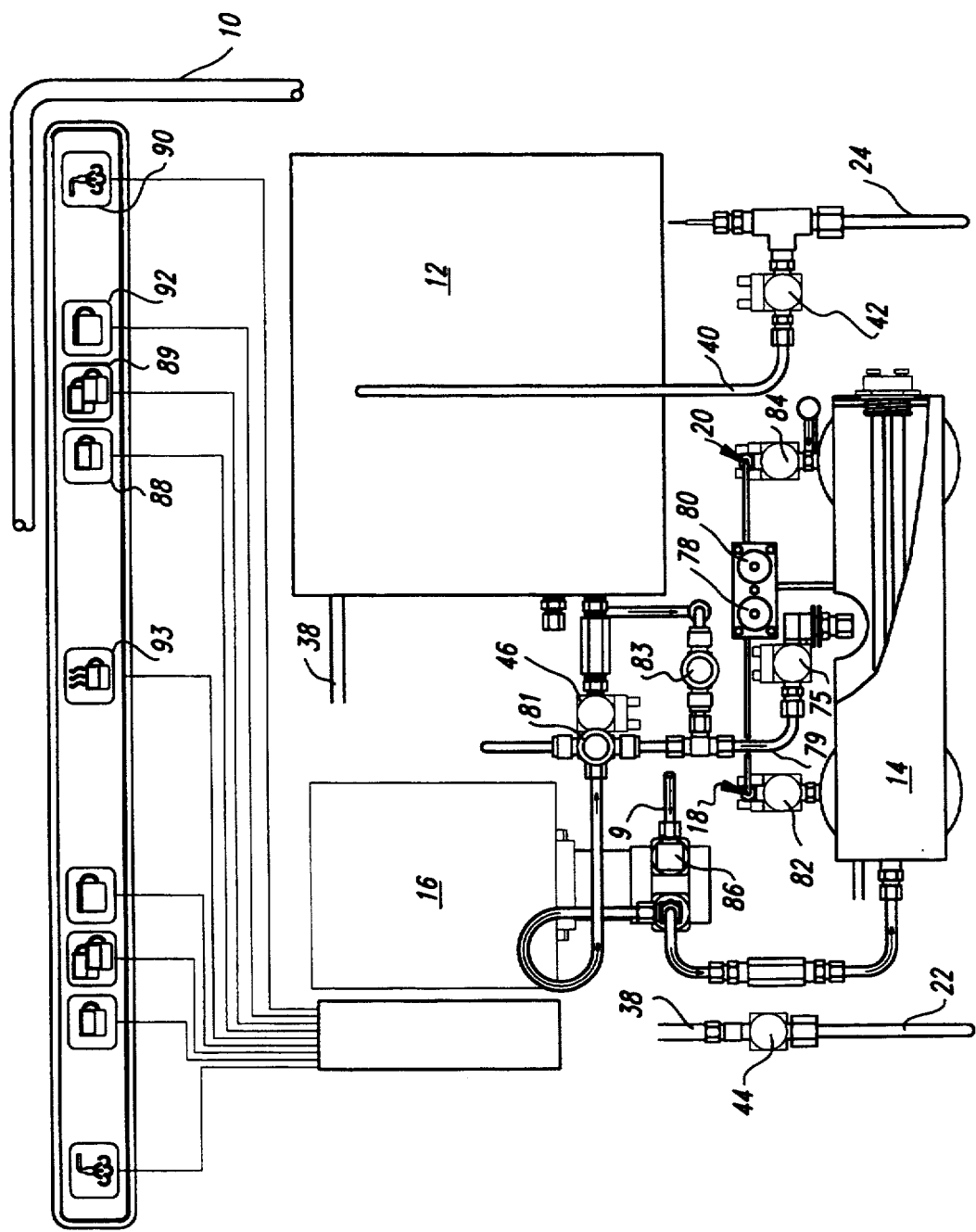
FIG. 1 is a schematic plan view showing unique features of the invention.

As best shown in FIG. 1, the espresso/cappuccino maker is provided with a housing 10, a steam tank or boiler 12, a hot water tank 14, a motor and pump unit 16, left-hand and right-hand dispensing assemblies 18 and 20, left steam wand 22, and right steam wand 24. These components with their control units to be described form an espresso or cappuccino maker capable of making demitasse, full cups of coffee, lattés, cappuccinos and the like as is well known. Since these types of apparatuses are well known, only the details necessary to describe the unique features of this invention will be described herein. It will be understood that those of ordinary skill in the art familiar with espresso/cappuccino makers be familiar with additional details common to espresso/cappuccino makers.

Figure 7:
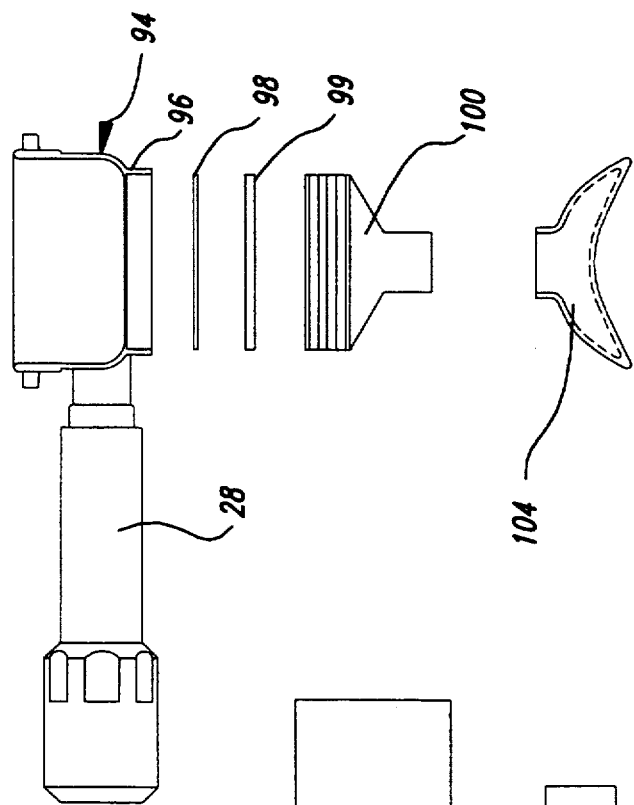
FIG. 7 is an exploded elevation of a unique portafilter.

As is also well known, water from the tank 14 is emitted through controlled sequences to either the left or right dispensing assemblies. The dispensing assemblies will have a conventional bayonet portafilter 26 in which a sieve or metallic filter holds a predetermined quantity of ground coffee beans, as is well known. In a preferred embodiment the conventional filter is replaced by a permanently secured screen 98 (FIG. 7). An insulated handle 28 is provided for holding and twisting the filter holder into the dispensing unit 26. Hot water from the tank 14 is then dispensed into the ground coffee, where it is discharged into a cup held on the drainboard 28 (FIG. 5), as is well known.

When cappuccinos are made, steam is emitted from the steam tank 12 through one of the steam wands 22 and 24 into a separate cup or metal pitcher of milk. A temperature probe 54 (FIG. 4) within the steam wand determines the amount of steam emitted to the milk so that the milk does not become overheated.

Figure 3:
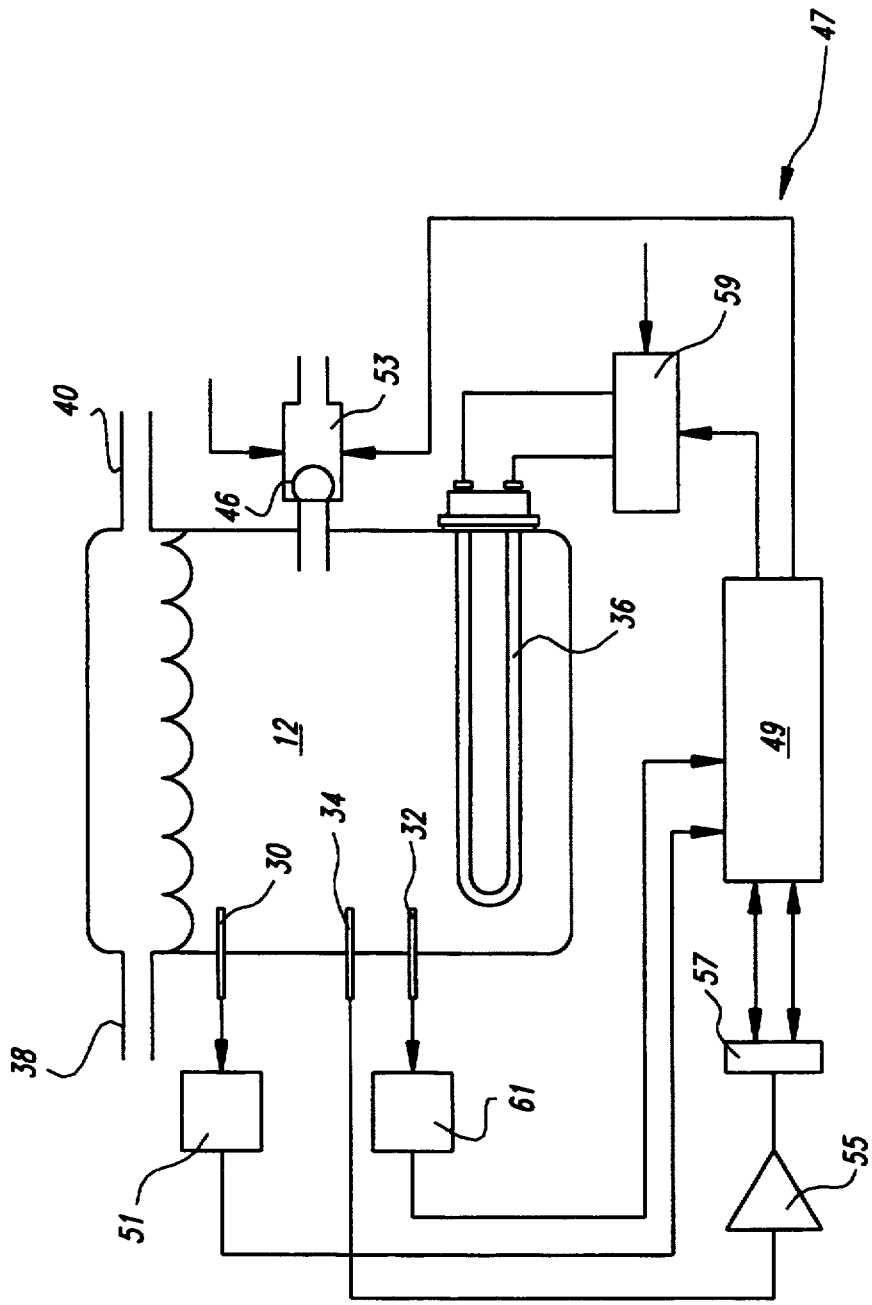
FIG. 3 is a vertical section through a steam generating tank shown in the apparatus of FIG. 1 and showing a schematic electrical diagram.

FIG. 3 illustrates one of the unique features of the invention. The steam tank 12 shown in FIG. 3 is provided with a high water level sensor 30, a low water level sensor 32, a temperature sensor 34, and a heating element 36. The steam wands 22 and 24 are connected to the steam tank by flexible steam conduits 38 and 40. The steam is emitted by controllable solenoid valves 42 and 44 located adjacent their respective steam wands 24 and 22. It should be understood, of course, that only one steam wand may be provided for smaller machines, or more steam wands may be provided for extremely large machines.

When there is a high demand for steam, such as when a large number of customer orders have been requested for cappuccino, it is desirable to deliver the desired amount of steam and to maintain the water in the steam tank within a desired temperature range. When steam is drawn from the tank, the temperature in the steam tank is reduced. When the steam is emitted, new steam is produced by heating the water in the steam tank, which reduces the water level in the steam tank. To replenish the water in the tank, cooler replenishing water is added through the solenoid valve 46 which is connected to a cold water supply, which further reduces the steam tank temperature.

To ensure that the water in the steam tank is maintained within the desired temperature range, this invention uniquely replenishes the steam tank with water from the cold water supply in accurately controlled step increments so that the desired water temperature range is maintained even during a heavy usage period. Water temperature stability is accomplished using a control circuit 47 shown in FIG. 3. The control circuit 47 includes a microprocessor 49 that is appropriately programmed to receive sensing signals from the water level sensors 30, 32 and the temperature sensor 34 and provide control signals to the heating element 36, the solenoid valve 46 and the water pump 16 in response to the received sensing signals. When sufficient steam is emitted to cause the water level to drop, the high water level sensor 30 produces a signal indicating that the water has lowered below the high water level sensor. The signal is passed to the microprocessor 49 via a first level sensor conditioning circuit 51 that adjusts the signal to a level appropriate to the microprocessor. The microprocessor emits a control signal to a water pump and valve control circuit 53 which causes the water pump 16 and solenoid valve 16 to allow cold water to be emitted into the steam tank.

However, if the temperature of the water in the tank as determined by temperature sensor 34 drops below a minimum value ($T_L$) of the desired temperature range, the cold water solenoid valve should be closed. The temperature sensor 34 sends a signal to the microprocessor 49 indicating that the water temperature has dropped. The signal from the temperature sensor is passed through a signal amplifier and filter circuit 55 which increases the signal level and removes noise in a known manner. The amplified and filtered signal then is passed through an analog to digital (A/D) converter 57 which converts the signal into an appropriate digital form before passing it to the microprocessor. The microprocessor signals the water pump and valve control circuit 53 to cause the solenoid valve 46 to prevent further cold water from being emitted into the steam tank. When the heating element 36 elevates the temperature above the desired high temperture value $T_H$, the cold water solenoid valve will be energized to emit enough cold water until the temperature sensor determines that the temperature of the water in the tank drops below the desired minimum value $T_L$. The solenoid valve will then be closed to the cold water supply even though the water level in the tank has not reached the high water level sensor. This sequence of emitting a small amount of water each time in steps will continue until the level of the water is again up at the high level. At this point the solenoid valve 46 will be closed to prevent further cold water from being emitted and the heating element will be operated to maintain water in the tank within the desired range.

If the demand for steam is so great that no cold water has an opportunity to be emitted, the water level will be diminished while maintaining a steam emitting temperature until the water falls to the low water sensor 32. There is a volume of water in the tank between the high water level sensor and the low water level sensor. This volume of water is generally more than enough to handle any peak demand for steam, even in the busiest or most heavily used commercial espresso/cappuccino maker such as in coffee bars or restaurants.

When the water level drops to the low water sensor 32, dispensing of steam thereafter occurs in a manner common to the industry. That is, the low water sensor passes a sensing signal to the microprocessor 49 via a second level sensor conditioning circuit 61 that adjusts the signal to a level appropriate to the microprocessor. The microprocessor sends a control signal to the water pump and valve control circuit 53 which causes cold water to be emitted to replenish the steam tank. The solenoids 42 and 44 will dispense steam, but in a much slower manner as cold water is added irrespective of the water temperature in the tank. This unique system is designed specifically to handle peak load conditions. In the mode of operation where the water level drops to the low water level sensor, there will be a slow-down in the ability to serve steam because cold water is added with each steaming operation and there is no longer a reserve of hot water from which to draw steam. In this condition, the instant apparatus will perform as other commonly designed steam tanks.

The emission of cold water into the steam tank 12 in stepped increments normally allows the water temperature within the steam tank to be maintained within the desired range without having to turn the heating element 36 off. However, if for any reason the water temperature rises above a maximum value ($T_M$) of the desired range, in such a case, the microprocessor 49 signals a heating element control circuit 59, which causes the heating element 36 to be turned off and remain off until the temperature sensor indicates that the desired temperature range has again been reached. Preferably, the temperature is allowed to decrease a small amount into the desired temperature range to a value $T_H$ less then $T_M$, rather than exactly when the maximum value $T_M$ is reached, before the heating element is turned on to prevent the heating element from repeatedly being turned on and of as soon as the temperature falls below or exceeds $T_M$. By turning off the heating element only when the water temperature exceeds the maximum valve $T_M$ and controlling the temperature substantially only with stepped emission of cold water, the invention employs the heating element to maximum efficiency, thereby saving upwards of 25 percent heating efficiency compared to prior art machines. The desired temperature range can be set to any range by appropriate programming of the microprocessor, with a range of 260 degrees Fahrenheit to 267 degrees Fahrenheit and a $T_H$ of 265 degrees Fahrenheit having been found to be desirable.

The apparatus and this method for controlling this temperature again provides for a large reservoir of hot steam at the desired temperature.

Figure 2:
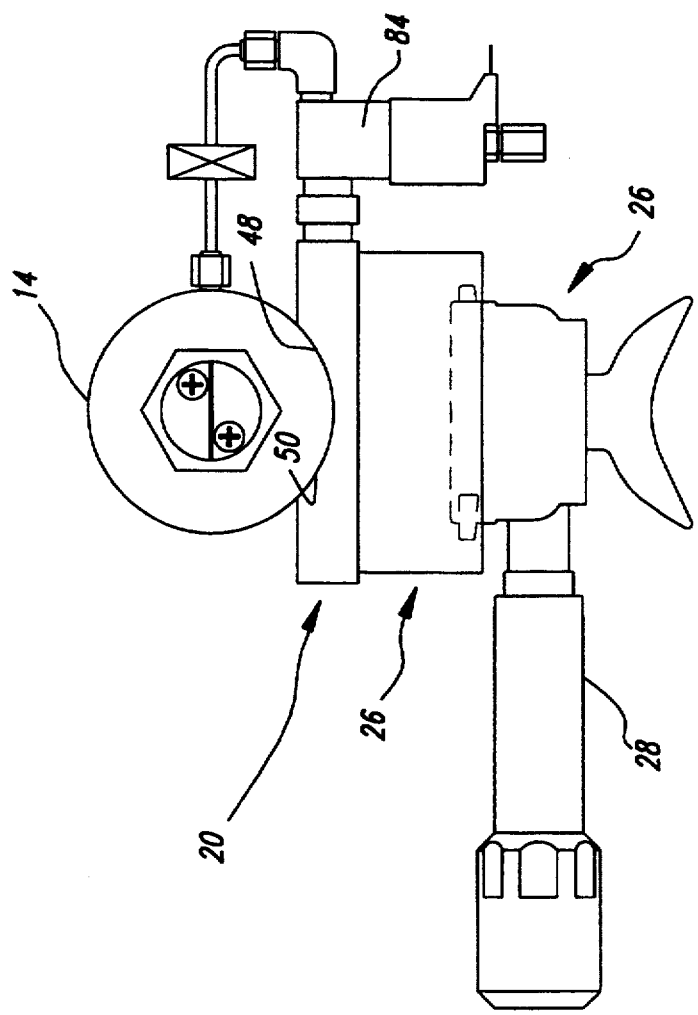
FIG. 2 is a fragmentary side elevation of a portion of the apparatus shown in FIG. 1.

The second unique feature of the invention is best shown in FIGS. 1 and 2. Most dispensing units for holding the portafilters are heated by circulating hot water through the dispensing unit. The portafilter holds the ground coffee beans in a premeasured quantity. Providing the hot water to the dispensing unit for this heating is well recognized as providing a better brewed coffee or espresso. However, circulating hot water through the dispenser increases the cost of the dispenser and makes maintenance of the dispenser more difficult.

In this invention, the dispenser is maintained in its heated condition but in a simple manner simply by forming a large thermal heat conductivity surface on the top of the dispenser and engaging that thermal conductivity surface with a large surface area of the hot water tank. As best shown in FIG. 2, each dispenser assembly is provided with a saddle or thermal conductivity surface 48. The water tank 14, which is always at a high temperature for dispensing hot water, has an outer housing 50 of metal which nests or fits within the thermal conductivity surface 48. Since the water in the tank 14 is hot and its housing 50 is hot, the heat from the tank is transmitted to the metal dispensing unit 20 through the surface 48. There is no need for circulating hot water through the dispenser since the thermal conductivity conducted from the tank through the surface 50 and the surface 48 is sufficient to maintain the entire dispensing unit 20 at a high temperature. As is well known, a portafilter or filter holder 26 is of metal also typically holds a sieve or filter, also which is of metal as is well known. The filter holder screws into the dispensing unit by a conventional bayonet locking fitting. The filter holder is provided with an insulated handle 28.

Figure 5:
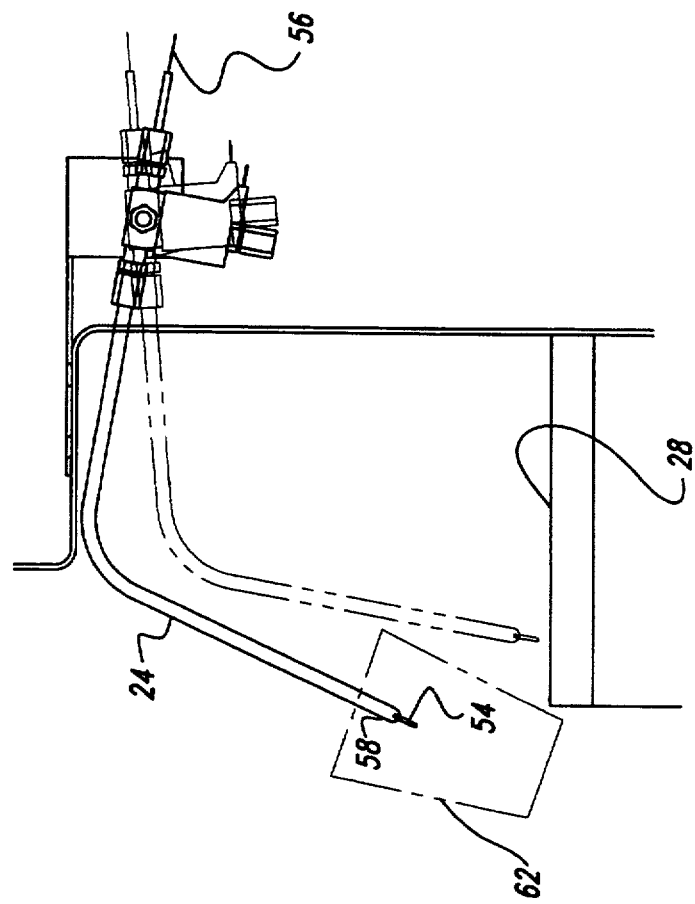
FIG. 5 is a side elevation of the steam wand.
Figure 4:
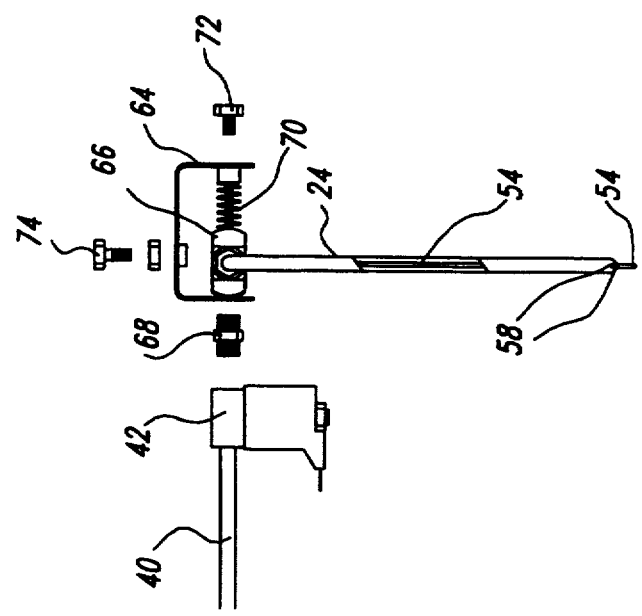
FIG. 4 is a front fragmentary schematic showing the uniquely mounted steam wand of the apparatus shown in FIG. 1.

Another feature of the invention is the provision of a milk temperature probe being located internally within the steam wand. This feature is best shown in FIGS. 4 and 5. The steam wand is provided with a temperature sensing probe 54 of a well-known kind. The probe, however, is uniquely provided within the hollow steam wand and exits at a sealed lower end of the wand. The upper end of the wand is connected to a wire 56 which goes to the controller 49. The steam wand is provided with four equidistantly spaced steam emitting holes 58 at the lower end of the wand adjacent and angularly disposed from protruding probe, that is, the holes direct steam away from the external portion of the probe. As is well known, the steam wand is placed into the milk in a cup or pitcher and steaming of the milk occurs until the desired temperature is sensed by the probe. Since the steam is directed away from the sensor in the tip of the probe, the cold milk resides in contact with the tip until the milk is at the desired temperature. To clean the probe it is necessary only to wipe the protruding end of the probe with a cloth immersed in hot water and to swing the probe down over the drainboard 28 and emit steam through the holes 58. Thus, the outside of the probe is cleaned by wiping away any dried milk and the inside of the wand around the probe is cleaned by the flushing of the steam through the holes 58. This simple cleaning technique is to be contrasted with other known temperature probes which are connected externally of the wand 24 providing numerous difficult to clean corners and other surfaces.

Another feature of the invention is also best shown in FIGS. 4 and 5. In this feature of the invention, the steam wand 24, for example, is shown in the elevated position in solid lines where it is immersed in a cup of milk shown schematically as 62. In the phantom-line or down position, the steam wand is pivoted down so that its dispensing holes 58 are over a drainboard or drain plate 28. The drain plate, as is well known, is connected to a drain to accommodate spilled water, spilled coffee, or excess steam that is flushed through the steam wand.

It is a unique feature of this invention, however, that the entire wand including the solenoid valve 42 all pivot as a unit in a bracket 64 which is secured to the housing 10. A coupling 66 is threadably connected to the steam wand and to a coupling 68 which threads into the steam dispensing solenoid valve 42. As is readily seen, the flexible conduit 40 is of sufficient length that the entire solenoid valve, threaded coupling, elbow coupling, and steam wand may be pivoted as a unit relative to the bracket 64. The steam wand thus can pivot from its raised position shown in solid lines in FIG. 5 to the phantom-line position quite easily without the need of any complex internal slip joints as is common in the industry. The steam wand is held in its raised and lowered position by friction from a spring 70 which is compressed by a pressure bolt 72 threaded through the bracket 64. By tightening the bolt 72 the spring is compressed providing more friction on the fitting 66 to determine the amount pressure necessary to pivot the wand from the upper to the lower position. The extent of swinging is controlled by a second bolt 74 that engages the top of the elbow coupling 66 to limit its downward swinging motion.

It is another feature of the invention that an alternative form of portafilter may be used. This portafilter 94 is shown in FIG. 7 and includes a metal filter holder 96 and an insulated handle 28. Rather than having a conventional loose fitting filter of one of several sizes for singles or double portions of ground coffee, the unique portafilter shown has a filter screen 98 held in place by a rubber O-ring 99 and the threaded end of a pressure relief valve 100. This pressure relief valve 100 is of conventional construction is incorporated into the portafilter. A pour spout 104 is connected to the relief valve. This FIG. 7 shows a double pour spout, however different size portafilters would have a single spout.

With this portafilter when a single size coffee portion is desired, the portion is placed on the screen 98. When a double portion of coffee is used, however, it is not necessary to substitute a different portafilter filter as is conventional but only to place the double coffee portion onto the screen 98. The integral screen arrangement thus eliminates the messy loose fitting various size removable filters that are a cause of difficulty in conventional portafilters.

Figure 6:
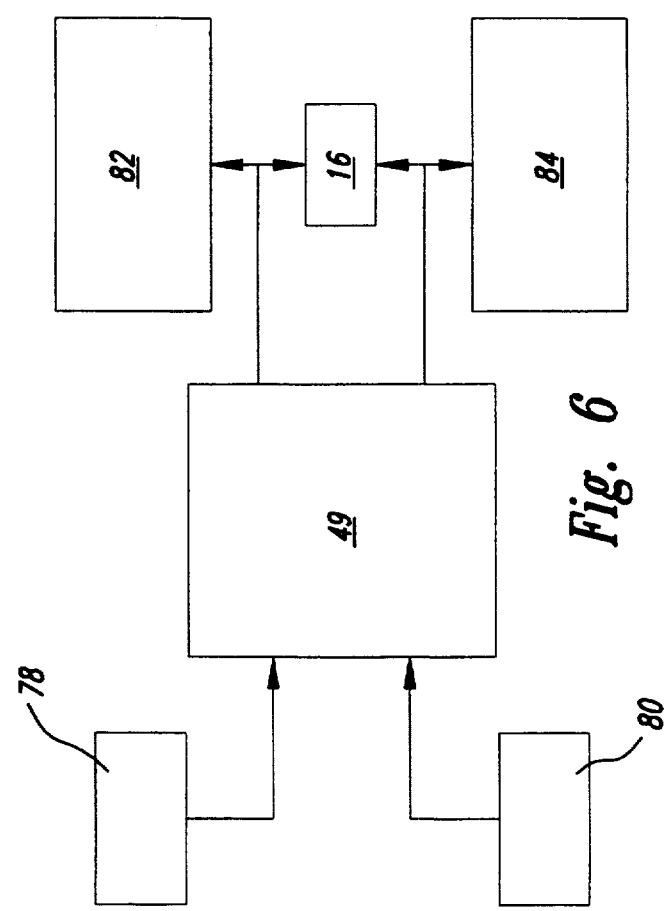
FIG. 6 is a block diagram showing how the hot water can be admitted to premoisten and allowing for soaking of the coffee in the dispensing unit.

Operation of the method and apparatus are best illustrated by the block diagram of FIG. 6 and schematic of FIG. 3.

Water is emitted through one or both of the flow meters 78 and 80 to the portafilters. These flow meters are conventional paddle-wheel meters which can emit pulses which determine accurately the quantity of water passing through the flow meter. The operator pushes a desired button 88, 89, 92 representing a single portion, double portion, or double-double portion of water at the dispensing station being used. The control unit then turns on the pump-motor 16 and opens the solenoid valve 82 or 84. The pump forces cold water into the tank 14 forcing hot water out through the valves 82 or 84 or both. The water leaving a valve passes through one of the flow meters for a few seconds to provide a small quantity of water only to soak the coffee held in the portafilter unit 26. Cold water from a source enters the pump at inlet line 9. This presoaking is desirable to obtain the right caramel and flavoring to the coffee liquid formed from the ground coffee. The soak time is adjustable by the central processing unit 49, and will vary depending upon the roasting technique by the coffee roaster, the fineness of the grind, and the variety of the coffee. After the desired presoak time, the pump-motor and solenoid are actuated so that additional hot water is again emitted through one of the solenoid valves 82 and 84 to one of the dispensing assemblies to pass the desired amount of water through the ground coffee. Of course, only one dispensing assembly is used if only one cup of coffee is desired. When the desired quantity of hot water has been detected by the flow meter, the solenoid valve 86 is closed and the pump-motor 16 de-energized. As cold water is admitted the heater in the tank 14 is energized to maintain the desired water temperature.

If it is desired to make a cappuccino, the control panel button 90 showing the steam emission is depressed. Steam will flow from the steam tank 12 until the button is again pushed, which determines how much steam is desired. If the steam brings the temperature of the water in the steam tank down below desired temperature, the heating element 36 is energized to return the temperature to the desired temperature, and replenishing water may be emitted as described earlier.

The button 93 is used for getting just hot water and actuates a solenoid valve 75 connected to a line 79 that receives a mixture of cold water from manually adjustable cold water valve 81 and hot water from manually adjustable hot water valve 83 to dispense the water at a controlled temperature.

While the preferred embodiments of the invention have been illustrated and described, it should be understood that variations will be apparent to one skilled in the art. Accordingly, the invention is not to be limited to the specific embodiment shown in the drawing.

We claim:

1. In a coffee making machine, steam emission apparatus for dispensing steam in the preparation of milk added coffee drinks, comprising:

a steam generating tank holding a quantity of water whose height is variable between a low water level and a high water level;

means for dispensing steam from said tank;

means for detecting said high water level;

means for detecting said low water level;

heating means for heating the water in said tank to reach a desired operating steam temperature; and control means for introducing water into the tank when the temperature has reached the desired operating water temperature but water is below the high water level but not introducing water if said temperature has not reached the desired operating water temperature, thence raising the water level in controlled quantities in stepped sequence after the temperature has reached said desired operating water temperature.

2. The machine of claim 1, said means for detecting said high water level being spaced a considerable difference above said means for detecting said low water level to create a steam generating water reservoir therebetween, said reservoir being available to generate steam even when the discharge of steam exceeds the heating capacity for heating replenishing cold water.

3. The machine of claim 1, said means for dispensing steam from said tank including at least two steam wands.

4. The machine of claim 1, said means for dispensing steam including a hollow steam wand having a lower end provided with a probe opening and at least one steam escape opening; and a temperature probe within said hollow wand and having a tip protruding out of said probe opening, wherein said protruding end of said probe is exposed for easy cleaning and said steam escape opening is in close proximity to said probe opening for flushing the interior of the wand around said temperature probe.

5. The machine of claim 1, said means for dispensing steam including a steam wand having a hollow one-piece tube for dispensing steam and having an upper end and a lower end;

a steam escape opening near the lower end of said tube;

the upper end being connected to a steam conduit, said steam conduit being pivotally mounted for swinging the entire wand from a raised cup steaming position to a lowered steam draining position, said steam conduit including a coupling joined to said tube, a solenoid valve coupled to said coupling and wherein the coupling and solenoid valve pivot as an integral unit with said tube.

6. The machine of claim 1, including an infused coffee liquid dispenser, and a hot water tank for dispensing a supply of heated water to said dispenser;

said dispenser having a heat transfer surface;
said water tank having a heat transfer surface; and
said dispenser and tank heat transfer surfaces having matching shapes so that one of the tank heat transfer surface and the dispenser heat transfer surface nests against the other to transfer by conduction heat from the tank through said heat transfer surface to the dispenser.

* * * * *